United States Patent Office 2,874,040
Patented Feb. 17, 1959

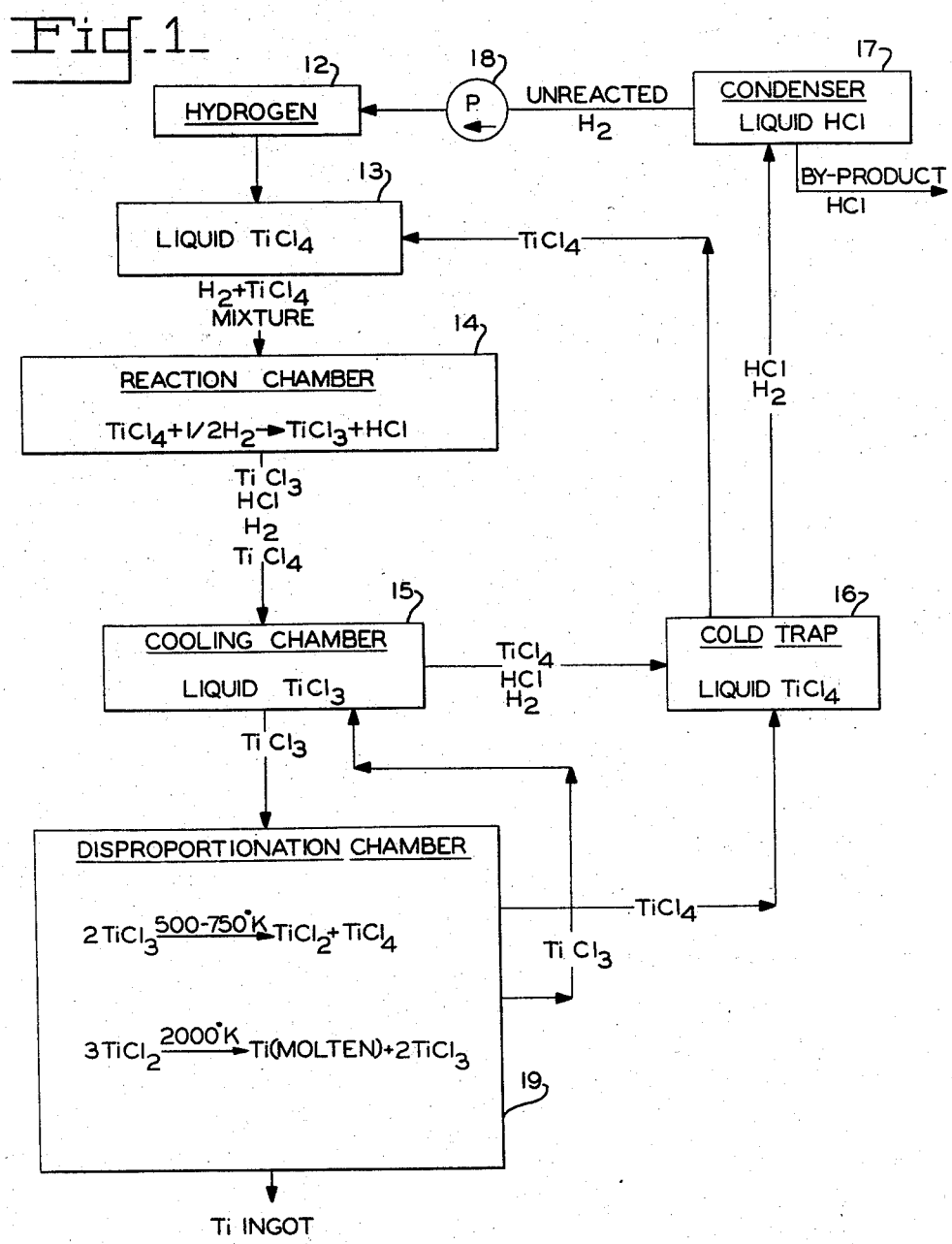

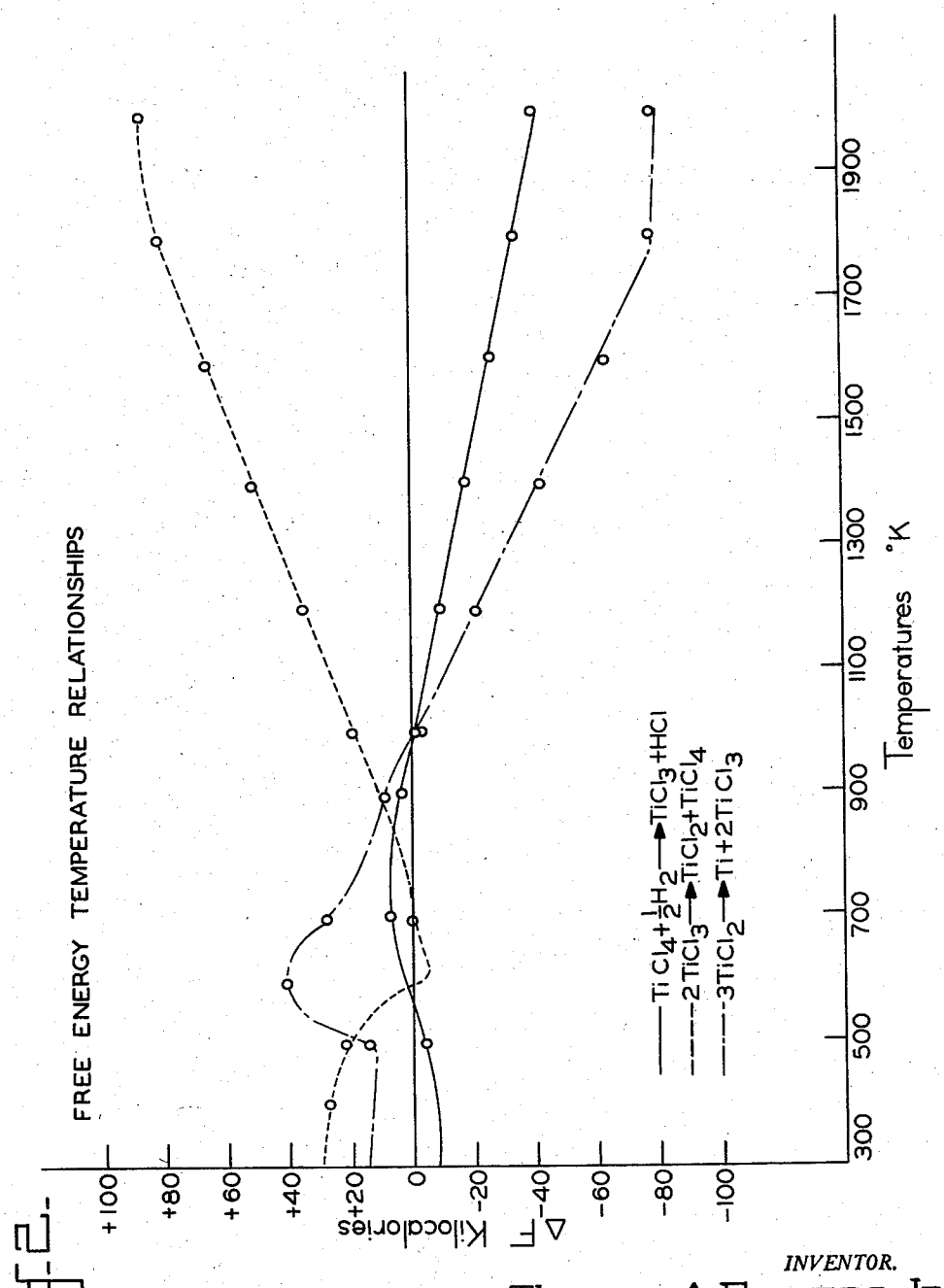

2,874,040

METHOD FOR THE PRODUCTION OF TITANIUM

Thomas A. Ferraro, Jr., Hyde Park, Mass.

Application August 25, 1955, Serial No. 530,649

4 Claims. (Cl. 75—84.5)

(Granted under Title 35, U. S. Code (1952), sec. 266)

The invention described herein may be manufactured and used by or for the Government for governmental purposes without the payment of any royalty thereon.

This invention relates to the commercial production of pure titanium in powder or ingot form and is more particularly directed to an economical method of producing titanium through the disproportionation of the dichloride at elevated temperatures.

Although titanium ores are plentiful and can be inexpensively mined, the expected widespread application of titanium alloys to industrial uses has been seriously curtailed by the relatively high cost of commercially producing the basic metal in powder or ingot form. Of all the methods currently in use, the least expensive is the reduction of titanium tetrachloride by the action of a reducing agent such as molten magnesium. However, such method does not offer much promise for any substantial cost reduction in the future in view of the necessity for providing magnesium of extremely high purity as well as the relatively complicated handling procedures to which the reactants are subjected in order to effect substantially complete consumption thereof. Furthermore, the purity of the titanium metal thus produced and the continuity of production are both affected by the necessity for leaching the reaction product to remove the chloride salts of the reducing metal. Although pure titanium has been successfully produced by employing hydrogen to reduce gaseous titanium tetrachloride in the presence of an electric arc at temperatures above 2000° K., thermodynamic analysis of this process has revealed that of the several reactions involved in the reduction of titanium tetrachloride to elemental titanium, the partial reduction to the trichloride is the most highly favored throughout the temperature range of 298° K. to 2000° K. Moreover, extrapolation of the data to higher temperatures indicates that titanium trichloride would continue to form even at temperatures above 2000° K. Thus, the principal reaction product of titanium tetrachloride is titanium trichloride which, once formed, displays considerable reluctance to disproportionate or reduce to elemental titanium.

It is, therefore, an object of this invention to provide an economical method for the continuous production of pure, ductile titanium.

Another object of the present invention is to provide an improved process for reducing a titanium halide to provide elemental titanium.

Still another object of this invention is to provide a method for commercially producing molten titanium of high purity as a direct product of the reaction involved.

A specific object of the present invention is to provide a process for economically and continuously producing elemental titanium by the disproportionation of titanium dichloride.

In the course of a thermodynamic study of the hydrogen reduction of titanium tetrachloride in order to determine the feasibility of such a process as means for producing elemental titanium on a large scale, it was found that the disproportionation of the dichloride into elemental titanium and the trichloride was highly favorable at temperatures in excess of 1000° K. Since titanium dichloride is ordinarily formed from the disproportionation of the trichloride, it became apparent that if the tetrachloride were deliberately reduced to yield the trichloride, the latter could be used to provide the dichloride from which a maximum yield of elemental titanium could be obtained.

The specific nature of the invention as well as other objects and advantages thereof will clearly appear from a description of a preferred embodiment as shown in the accompanying drawings in which:

Fig. 1 illustrates a flow diagram designed for the commercial production of elemental titanium in accordance with the teachings of the present invention; and Fig. 2 is a chart of the free energy temperature curves of the various reactions involved in the process of the present invention.

As shown in Fig. 1, pure hydrogen is preferably kept under pressure in a storage chamber 12 which is suitably connected to a second storage chamber 13 in which titanium tetrachloride is maintained in liquid form but at a temperature high enough to provide a considerable degree of vapor pressure therein. Thus, when the hydrogen passes through storage chamber 13 at a controlled rate, the hydrogen becomes saturated with titanium tetrachloride vapor and the resulting mixture can then be introduced into a conventional high-temperature type of reaction chamber 14 wherein the temperature is maintained above 1000° K. As shown in Fig. 2, the free energy characteristics inherent in the hydrogen reduction of titanium tetrachloride at these temperature levels insure a favorable and efficient reaction in which one mole of hydrogen chloride gas is produced per mole of titanium trichloride.

The reaction products are then introduced into a cooling chamber 15 maintained at a temperature above the point at which the trichloride will disproportionate but sufficiently below the boiling point of 900° K. to effect the rapid liquefaction thereof. The hydrogen chloride gas and the unreacted quantities of the hydrogen and titanium tetrachloride gases continue through the system to pass into a conventional cold-trap 16 in which the unreacted titanium tetrachloride is liquefied at a temperature of about 410° K. so that it can eventually be returned to storage chamber 13 to replenish the supply therein. The hydrogen chloride gas may then be separated from the hydrogen by a suitable condenser 17 so that the latter may be returned to storage chamber 12 to replenish the supply therein. The necessary travel of the reaction products and the hydrogen and titanium tetrachloride gases may be insured by a conventional pump 18 preferably disposed between storage chamber 12 and condenser 17. The separation of the hydrogen chloride and the hydrogen gases may also be effected by passing them through water whereupon the hydrogen chloride gas dissolves to form hydrochloric acid. All traces of water must thereafter be removed from the hydrogen but this can be readily accomplished by a conventional drying train or the like. Whichever method of separating the hydrogen chloride gas is employed, the end product is one which is constantly being used in industry.

The liquid titanium trichloride is drawn off from the cooling chamber 15 as desired and is introduced into a disproportionation chamber 19. It has been found that the disproportionation of titanium trichloride is thermodynamically favorable only at temperatures between 600° K. and 700° K. and inasmuch as the unfavorability of the reaction increases drastically at higher temperatures, chamber 19 should be heated to a temperature between 550° K. and 750° K. in order to insure a maximum yield of the dichloride from which the elemental titanium is subsequently produced. The disproportionation of every two moles of the titanium trichloride provides one mole each of gaseous titanium tetrachloride and of solid titanium dichloride. The titanium tetrachloride is arranged to be continuously pumped from chamber 19 into cold-trap 16 in order to drive the reaction to completion. After the gaseous tetrachloride is liquefied, it is arranged to be returned to storage chamber 13 for replenishing the supply of the reactant therein. In the event a pumping system should prove too costly, the titanium tetrachloride may be removed from chamber 19 during the disproportionation of the trichloride by continuously passing a stream of inert gas such as argon therethrough.

When a sufficient quantity of titanium dichloride has been collected in disproportionation chamber 19, the temperature thereof is rapidly raised. Although every three moles of titanium dichloride will yield two moles of gaseous titanium trichloride and one mole of elemental titanium at temperatues above 1000° K. as indicated by the thermodynamic analysis of Fig. 2, the temperature is actually raised to 2000° K. which is above the melting point of titanium. As a result, molten titanium is produced directly from the disproportionation reaction thereby eliminating the necessity for any subsequent melting thereof.

While the disproportionation of the dichloride has been reported to yield titanium tetrachloride and elemental titanium, thermodynamic analysis indicates that such reaction is thermodynamically unfavorable and, therefore, could not be employed for the economic commercial production of the metal. However, at temperatures in excess of 1000° K., the disproportionation of the dichloride will yield the trichloride rather than the tetrachloride. As shown by the thermodynamic data of Fig. 2, the formation of the trichloride along with elemental titanium is not only more favorable than the reaction in which the tetrachloride is produced as one of the end products but actually increases in favorability with an increase in temperature. This is because the reluctance of the trichloride to disproportionate or to be reduced actually increases as the temperature is raised whereas the opposite is true in the case where tetrachloride is formed. The titanium trichloride is, of course, returned to cooling chamber 15 to replenish the supply therein while the liquid titanium may be tapped for pouring into the desired ingot form. If an inert gas is employed to remove the titanium tetrachloride from chamber 19, it may be recycled therethrough by a small conventional circulating pump in order to remove the titanium trichloride subsequently formed during the disproportionation of the titanium dichloride. The inert gas can also be utilized to prevent any contamination of the molten titanium during the tapping thereof.

Accordingly, the foregoing process of producing titanium from the tetrachloride thereof enables all the reactions to be carried out under the temperatures and conditions which have been found to be the most favorable from a thermodynamic viewpoint. Inasmuch as the disproportionation of the titanium dichloride is carried out above the melting point of titanium, the elemental metal is produced in liquid form thereby eliminating the usual melting procedures required to convert sponge or solid particles to ingot form. Furthermore, the fact that every reaction product with the exception of the hydrogen chloride is either used to carry on the process or is returned to replenish the original supply of that particular material renders the entire process extremely efficient and economical. Although the hydrogen chloride is a by-product, its widespread application to industrial uses actually increases the over-all economy of the entire process. While the production of the titanium dichloride appears to be fairly complex, a more direct method of preparation which will be technically feasible has not as yet been discovered in the art. However, in the event a direct method should be devised, the present invention also contemplates the possible substitution thereof for the herein described steps of commercially producing titanium dichloride from titanium tetrachloride.

Although a particular embodiment of the invention has been described in detail herein, it is evident that many variations may be devised within the spirit and scope thereof and the following claims are intended to include such variations.

I claim:

1. The method for producing elemental titanium which comprises reacting titanium tetrachloride with hydrogen at a temperature above 1000° K. to reduce the titanium tetrachloride to gaseous titanium trichloride, cooling the reaction products to a temperature below 900° K. to liquefy the titanium trichloride without concurrent disproportionation thereof, isolating the liquefied trichloride from the other reaction products, thereafter subjecting the liquefied titanium trichloride to a temperature between 550° K. and 750° K. to effect the disproportionation thereof into gaseous titanium tetrachloride and solid titanium dichloride, separating the titanium tetrachloride from the titanium dichloride, thereafter subjecting the titanium dichloride to a temperature above 2000° K. to effect the disproportionation thereof into elemental liquid titanium and gaseous titanium trichloride, continuously removing the titanium trichloride from the vicinity of the titanium, and then tapping the liquid titanium for the subsequent recovery thereof in ingot form.

2. A continuous method for the recovery of elemental titanium from titanium tetrachloride which comprises reacting hydrogen with titanium tetrachloride at a temperature above 1000° K. to reduce the latter to titanium trichloride and hydrogen chloride gases, cooling the reaction products to a temperature above the point at which the titanium trichloride will disproportionate but sufficiently below the 900° K. boiling point thereof to effect rapid liquefaction to a temperature substantially below 410° K. to liquefy the unreacted titanium tetrachloride, returning the liquefied titanium tetrachloride to the original source of supply for replenishment thereof, separating the unreacted hydrogen from the hydrogen chloride gas for returning the former to replenish the original supply thereof, removing the hydrogen chloride as a by-product of the method, subjecting the liquefied titanium trichloride to a temperature between 550° K. and 750° K. to disproportionate into gaseous titanium tetrachloride and solid titanium dichloride, separating the titanium tetrachloride from the titanium dichloride for eventually returning the former to replenish the original supply thereof, thereafter subjecting the titanium dichloride to a temperature above 2000° K. to disproportionate into elemental liquid titanium and gaseous titanium trichloride, returning the titanium trichloride to replenish the previously created supply, and recovering the elemental titanium in ingot form.

3. The combination defined in claim 2 wherein the removal of the hydrogen chloride as a by-product comprises the steps of passing the mixture of hydrogen and hydrogen chloride gases through water to dissolve the latter to form hydrochloric acid, and subsequently removing all traces of water from the hydrogen prior to the return thereof to the original source of supply.

4. A continuous method for recovering elemental titanium from titanium tetrachloride which comprises the steps of passing hydrogen gas through liquefied titanium tetrachloride, subjecting the resulting gaseous mixture to a temperature above 1000° K. to reduce the titanium tetrachloride to titanium trichloride, cooling the reaction products to a temperature below the liquefaction point of the titanium trichloride but above the disproportionation point thereof, isolating the titanium trichloride prior to cooling the remaining reaction products to a temperature substantially below 410° K. to liquefy the unreacted titanium tetrachloride, returning the liquefied titanium tetrachloride to the original source of supply for the replenishment thereof, subjecting the liquefied titanium trichloride to a temperature between 550° K. and 750° K. to disproportionate into gaseous titanium tetrachloride and solid titanium dichloride, continuously passing an inert gas through the reaction zone to remove the titanium tetrachloride therefrom, liquefying the titanium tetrachloride for the return thereof to the original source of supply, thereafter subjecting the titanium dichloride to a temperature above 2000° K. to disproportionate into elemental liquid titanium and gaseous titanium trichloride, recycling the inert gas to remove the titanium trichloride from the reaction zone, returning the titanium trichloride to the previously formed liquid supply thereof, continuing the passage of the inert gas over the liquid titanium to prevent any contamination thereof, and recovering the titanium in ingot form.

References Cited in the file of this patent

UNITED STATES PATENTS

| | | |
|---|---|---|
| 1,046,043 | Weintraub | Dec. 3, 1912 |
| 2,647,826 | Jordan | Aug. 4, 1913 |
| 2,667,413 | Jordan | Jan. 26, 1914 |
| 2,706,153 | Glasser | Apr. 12, 1955 |
| 2,732,292 | Jordan | Jan. 24, 1956 |
| 2,783,142 | Singleton et al. | Feb. 26, 1957 |

OTHER REFERENCES

Stahler et al.:—Deutsche Chemische Gesellschaft Berichte. Jahrig 44, Band 3, Oct. 9—Dec. 11, 1911. Pages 2906–2915.

Hogman:—Handbook of Chemistry and Physics, 26th ed., published 1942 by Chemical Rubber Publ. Co., Cleveland, Ohio. Pages 476–477.

Eastman et al:—Physical Chemistry, 1st ed. Pages 257–260. Published 1947 by McGraw-Hill Book Co., Inc., N. Y.